1

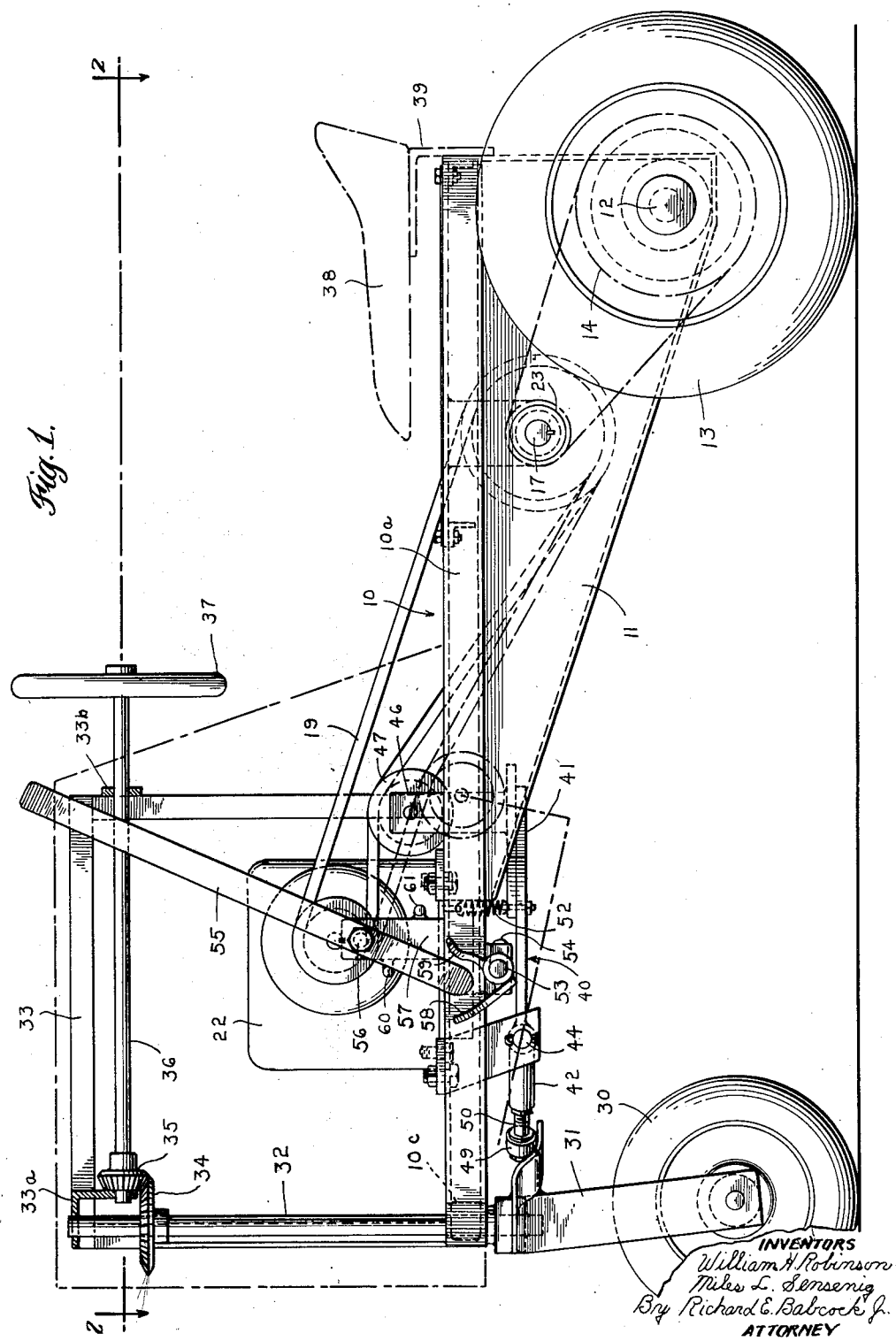

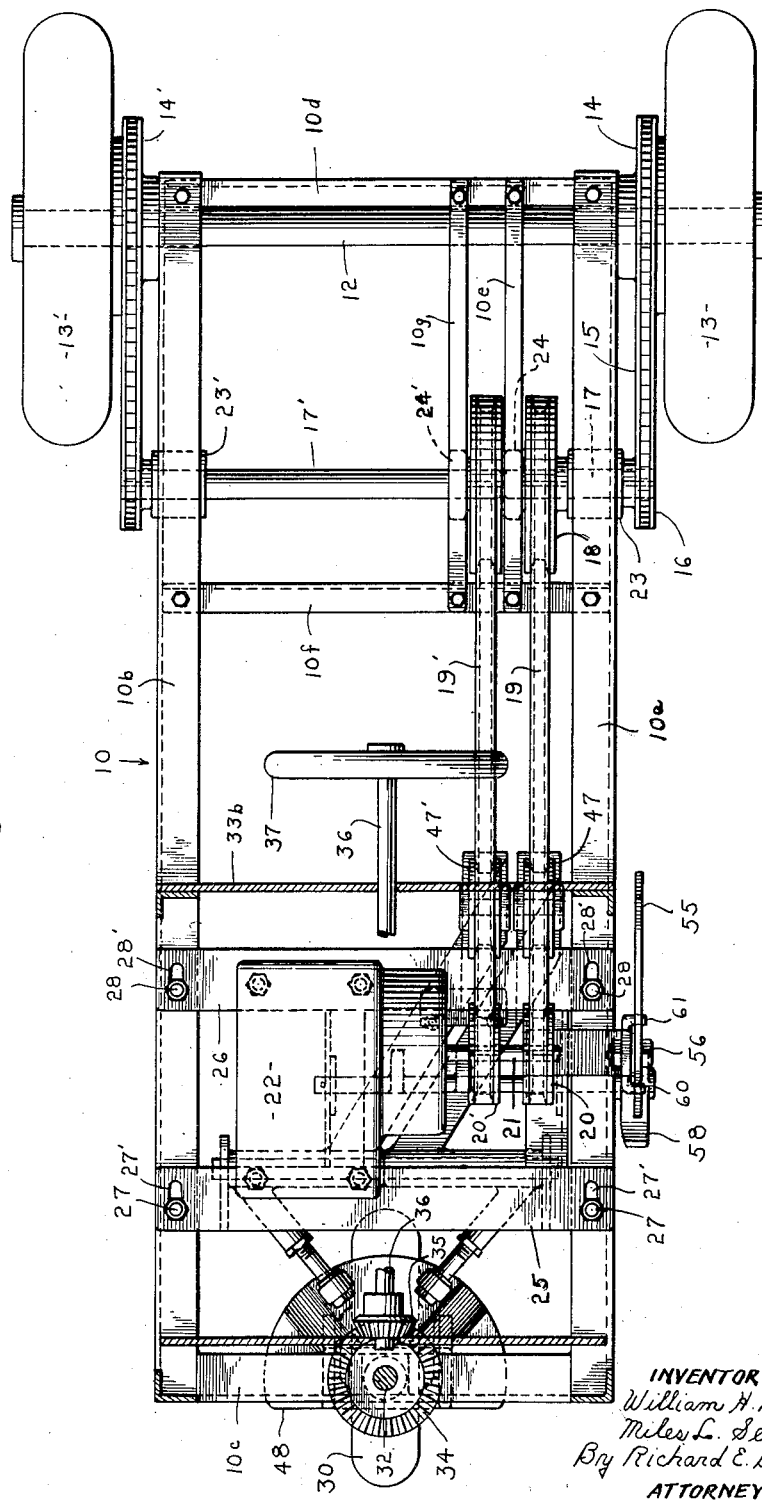

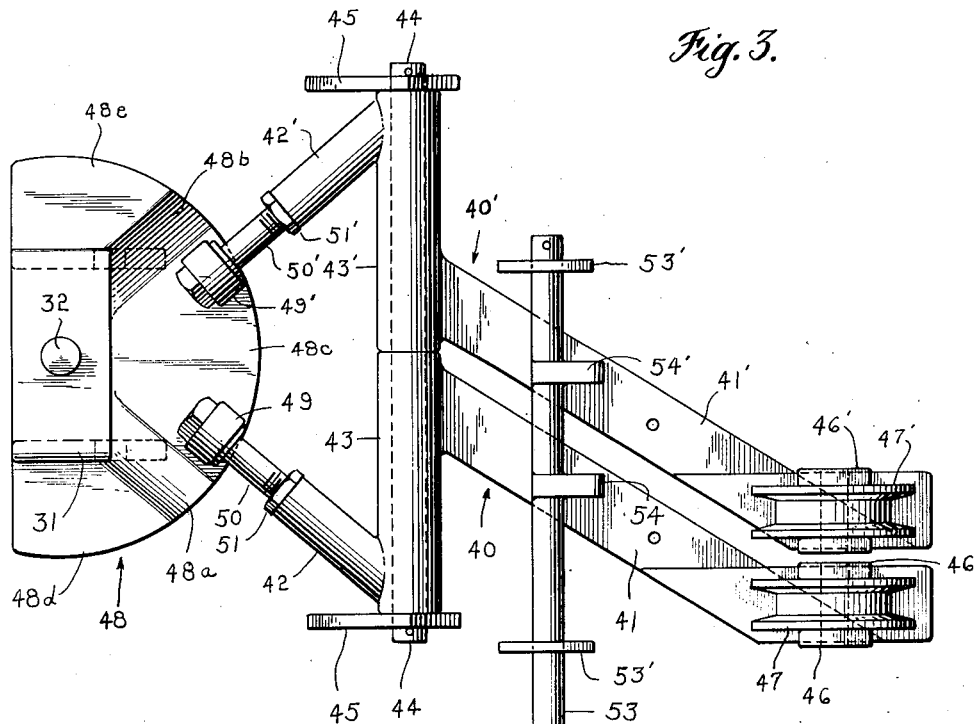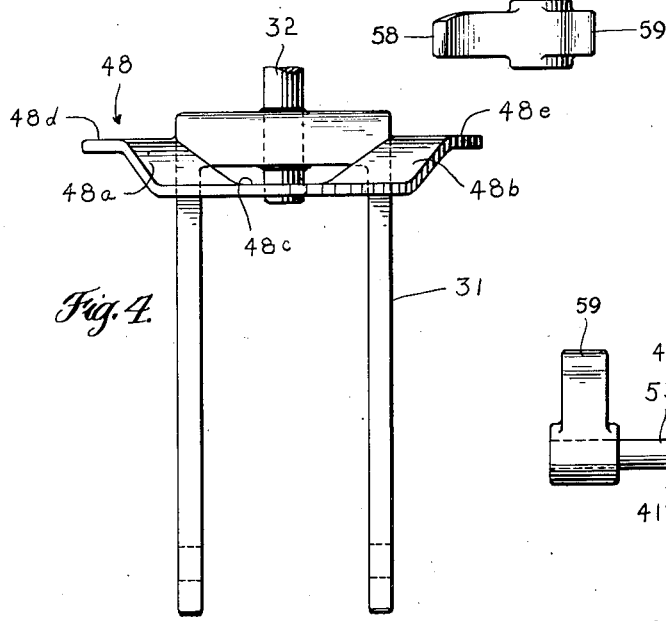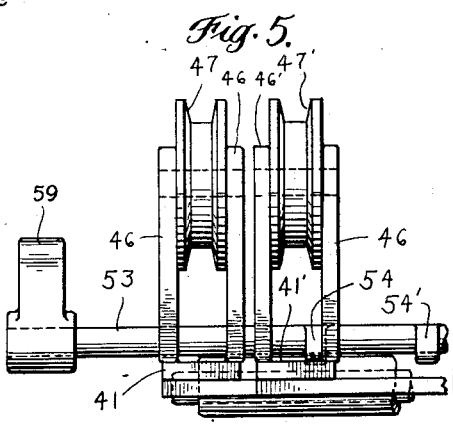

2,778,437

VEHICLE WHEEL DRIVE BELTS SELECTIVELY CONTROLLED IN RESPONSE TO STEERING

William H. Robinson, Honey Brook, and Miles L. Sensenig, Lancaster, Pa., assignors, by mesne assignments, to Sperry Rand Corporation, New Holland, Pa., a corporation of Delaware Application December 15, 1954, Serial No. 475,348

13 Claims. (Cl. 180—6.34)

This invention relates to drive means for self-propelled wheeled vehicles of the class which have independently rotatable laterally spaced drive wheels driven from a power unit on the vehicle through separate power chains, each of which includes a belt drive having a belt tightener associated therewith, the belt tighteners for the respective belt drives being controlled through actuation of the vehicle steering mechanism to permit slippage of the belt drive to one of the wheels during the making of a turn, thus to provide a differential action between the drive wheels.

The prior art shows a number of examples of such vehicles having individual belt drives in the transmissions to the respective drive wheels, and belt tighteners controlled through actuation of the steering mechanism to permit slippage of the inside wheel during the making of turns. However, generally speaking, these all utilize comparatively complicated linkages or mechanisms between the control element of the steering mechanism and the belt tighteners.

In the present invention the belt tighteners are controlled by direct coaction with a control element actuated responsive to movement of the steering mechanism without the need for an intervening mechanism or linkage such as heretofore required. Thus, by virtue of the present invention, it is possible to achieve the results of the prior machines by a considerably simpler and more economically produced mechanism having substantially fewer parts.

In accordance with the present invention, the belt tighteners for the respective belt drives assume the form of levers pivoted on the vehicle for swinging movement into and out of operative belt tightening engagement with the belts of the respective belt drives, both of these levers having their said movement controlled through direct coaction with a common control element which, in the preferred form of the invention, comprises a cam rotatable about a vertical axis, together with the steering shaft, this cam having an axially presented cam face with cam surfaces or portions adapted for alternate coaction with the respective levers, depending on the direction in which the vehicle is steered. The arrangement is such that the levers are located between and out of engagement with either of these cam surfaces when the vehicle is steered straight ahead, thus to permit said levers to maintain the drive belts operative to transmit driving force to both said wheels.

In accordance with a further feature of the invention, the belt tightening levers are both urged into operative belt tightening engagement with their respective belts by suitable resilient or yielding means, while the control cam cooperates with the said levers to disengage one or the other of them from its respective belt. In conjunction with such resiliently operatively positioned levers there is employed a means separate from the control cam for simultaneously actuating both said levers to permit slackening of their respective belts, irrespective of the position of the control cam. Thus, the levers may be utilized in the manner of a usual vehicle clutch to completely disengage the power unit from both driving wheels and permit the vehicle to remain stationary while the power unit or motor is still in operation. Accordingly, the belt tighteners of the instant invention are capable of replacing both the usual differential gears and the clutch assembly such as employed in conventional vehicle drives.

It is a further feature of the invention to provide means for so adjusting the coaction between the control cam and the respective belt tighteners or levers as to provide for a variation in the speed with which the belt tension of either belt is relaxed responsive to actuation to the steering mechanism, thus making it possible to obtain a generally optimum degree of slippage of the drive transmission to the inner drive wheel on any given turn such as will maintain the transmission of a yielding drive to said inner wheel at least during the early stages of the turn or, in other words, where the turn is about a relatively large radius.

In this application there is shown and described only the preferred embodiment of our invention simply in order to set forth the best mode contemplated by us of carrying out our invention as by law required. However, we recognize that our invention is capable of other and different embodiments than the one here shown and described, and that its several details may be modified in various ways, all without departing from our invention. Accordingly, the drawings and description herein are to be understood as being merely illustrative in nature and not as exclusive.

In the accompanying drawings:

Figure 1 represents a side elevation of a self-powered vehicle in the form of a small garden tractor embodying the drive mechanism of the invention;

Figure 2, a section on the line 2—2 of Figure 1;

Figure 3, a plan view of the belt tighteners and the control mechanism therefor, this view being of a diagrammatic nature in which the several parts shown are separated from the other vehicle structure;

Figure 4, a front elevation of the steering fork of the front wheel, including the lower end portion of its steering shaft, together with the belt tightener control cam of the invention; and, Figure 5, a rear end elevation of the mechanism illustrated in Figure 3.

The garden tractor chosen by way of exemplification to illustrate the preferred application of the invention is in the form of a usual self-propelled steerable wheeled vehicle movable generally in the direction of its longitudinal axis. Such vehicle comprises a rigid frame or a chassis generally designated 10 comprising the laterally spaced longitudinal frame members 10a and 10b interconnected by the front and rear end cross members 10c and 10d, respectively. The frame also comprises a pair of laterally spaced bolsters or brackets 11—11 rigidly fixed to and depending from the respective frame members 10a, 10b. A fixed or dead rear axle 12 for the vehicle extends laterally thereof and is fixedly supported by said bolsters 11. Freely rotatable on opposite ends of this axle 12, for relatively independent rotation, are the laterally spaced rear drive wheels 13 and 13', respectively, which are driven by similar power transmission mechanisms either from the same or separate power units hereinafter described. Since these power transmission mechanisms for the respective rear drive wheels 13—13' are generally similar, it will suffice to describe in detail only the drive transmission mechanism for the one wheel 13, it being understood that the several parts or elements of the transmission mechanism for the wheel 13' will be designated by a similar, but primed reference character, and will cooperate in identical manner to the elements utilized in the transmission mechanism for wheel 13.

To this end it will be seen that the wheel 13 has a sprocket 14 fixed concentrically to its hub. This sprocket 14 is driven through a usual sprocket chain 15 from a drive sprocket 16 fixed on the countershaft 17 rotatably journaled transversely of the frame 10 and having a pulley wheel or sheave 18 keyed thereon and driven by a belt 19 from a drive pulley or sheave 20 fixed on the output shaft 21 of a power unit 22, preferably in the form of a small internal combustion motor carried by the frame 10 in a manner hereinafter to be described.

The countershaft 17 is rotatably supported between a bearing 23 suspended from the frame member 10a and bearing 24 fixed beneath a frame member 10e which is supported between the end frame member 10d and a cross frame member 10f. It will be noted that the separate and independently rotatable countershaft 17' is similarly supported by bearing 23' on the frame member 10b and bearing 24' carried by longitudinal frame member 10g which, in turn, extends between and is supported by the rear cross frame members 10d and 10f.

It will be seen that the power unit or motor 22 is supported on the frame 10 by transverse members 25 and 26, respectively, supported transversely between the frame members 10a and 10b and secured thereto by bolts 27 and 28, respectively.

In order to provide a ready means for simultaneously adjusting the tension of the drive belts 19 and 19', the motor 22, its output shaft 21 and drive pulleys 20, 20' are made longitudinally adjustable on the frame 10. In the present instance this is easily and simply accomplished by providing the members 25 and 26 with longitudinally extending slots 27' and 28', respectively, to receive their cooperating bolts 27, 28, whereby the motor 22 may be adjusted longitudinally on the frame 10 within the limits permitted by these slots.

The steering mechanism for the said vehicle is exemplified by a front steering wheel 30 rotatably supported between the depending legs of a usual bicycle type fork 31 mounted at the lower end of a vertical steering shaft or spindle 32 which is rotatably journaled at its lower and upper ends, respectively, through the front cross frame member 10c and through the vertically registering frame member 33a of a super-structure 33 rigidly supported on the frame 10 as best shown in Figure 1.

Steering movement is imparted to the wheel 30 through a bevel gear 34 fixed on shaft 32 in mesh with bevel gear 35 fixed on a horizontally and longitudinally disposed steering shaft 36 adapted for manual control through a usual steering wheel 37. The shaft 36 is rotatably supported between the cross frame members 33a and 33b of super-structure 33.

It will be seen that the tractor may be steered in conventional manner by an operator carried by the vehicle on a seat 38 supported on vehicle frame 10 by a bracket 39 as indicated in Figure 1 of the drawings.

The arrangement of parts thus far described may be regarded as exemplifying old and heretofore known arrangements. The instant invention resides in the provision of novel and simplified mechanism for individually controlling the power transmission mechanisms to the relatively laterally opposed rear drive wheels 13, 13' to permit slippage between the inside wheel and the power transmission thereto during the making of a turn, this being accomplished responsive to actuation of the steering mechanism and serving as a simplified positively acting and economical substitute for the usual differential gearing conventionally employed in automotive structures.

To this end the belts 19 and 19' in the power transmission mechanisms to the respective wheels are normally maintained taut and in driving relation with their associated pulley wheels or sheaves by belt tighteners 40 and 40' which are actuated responsive to steering movement to permit slippage of the belt drive to the innermost rear drive wheel 13 or 13' as the case may be, during the making of a turn. It will be understood, however, that the belt tighteners 40 and 40' operate normally during straight ahead movement of the tractor or vehicle to maintain both of these belt drives operative and thus maintain drives to both of the rear wheels 13 and 13'.

Belt tighteners 40 and 40' are of similar construction in all material respects and it will, therefore, suffice to describe in detail only the belt tightener 40, it being understood that the corresponding parts of belt tightener 40' will be designated by similar, but primed reference characters. With this in mind, it will be seen that belt tightener 40 as best shown in Figure 3, consists essentially of a lever having arms 41 and 42, respectively, rigidly supported by a sleeve or hub 43 by means of which the lever is medially fulcrumed on cross shaft 44 fixedly supported by and beneath the frame members 10a and 10b by usual hangers 45. Rigidly supported on and constituting a part of the lever arm 41 are laterally opposed brackets 46 between which is freely rotatably journaled a tightener or idler wheel 47 moveable into and out of tightening engagement with the associated drive belt 19 responsive to rocking of the lever 40 about its fulcrum 44.

Such rocking of the belt tightener or lever 40 is automatically controlled responsive to actuation of the vehicle steering mechanism by means of a control cam 48 connected to the steering mechanism for movement responsive to operative movement of the steering mechanism. It will be understood that the forwardly projecting arms 42 and 42' of both levers 40 and 40' are disposed for cooperation with the control cam 48.

In the embodiment shown, control cam 48 is fixedly supported on steering fork 31 concentric to its steering shaft or pintle 32 for rotary movement with the steering shaft 32, fork 31, and wheel 30.

In this embodiment the lever arms 42 and 42' project from their fulcrum sleeves 43—43' in radial directions to the rotational axis of the cam 48. The cam 48, in turn, has an axially upwardly directed cam face, including relatively circumferentially spaced inclined cam surfaces 48a and 48b which, in the straight ahead position of the steering mechanism and wheel 30, are disposed on opposite sides of the respective arms 42, 42'. In order to facilitate the cooperation between the arms 42 and 42', these preferably are provided with follower rollers 49—49' for coaction with the cam 48. These rollers 49 and 49' preferably are rotatably supported on pintles 50—50' threaded into and constituting extensions of the lever arms 42 and 42', these pintles being secured in position by lock nuts 51 and 51', respectively. The belt tighteners or levers 40—40' are normally urged resiliently toward operative tightening engagement with their respective drive belts by means of springs, such as 52 connected under tension between the rearwardly extending lever arms 41 and 41' and the respective frame members 10a and 10b.

In order to permit belt tightening positioning of the belt tighteners 40—40' in the straight ahead position of the steering mechanism, the cam 48 is provided with a recessed or depressed portion 48c between the inclined cam surfaces 48a and 48b so that the follower rollers 49 and 49' may normally be received in this recessed portion. From the depressed or recessed portion 48c both cam surfaces 48a and 48b are inclined upwardly to their junctures with the respective radially coplanar surfaces 48d and 48e, respectively, shown in Figure 3 and Figure 4. The purpose of the surfaces 48d and 48e is simply to insure that the lever 40 or 40' is maintained out of tightening engagement with its associated belt 19 or 19', as the case may be, after the steering mechanism has once been turned to cause the coaction between the follower 49 or 49' and cam surface 48a or 48b to disengage the belt drive associated with either of said levers.

It is desirable to provide some means for disconnecting the drives to both rear wheels 13 and 13' from the power source 22 in the manner of a usual automotive clutch, so that the vehicle may be brought to rest with the motor 22 running. For this purpose we adapt the belt tighteners 40 and 40' to permit simultaneous slippage of the belts 19—19' independently of the position of the control cam or element 48. Such adaptation is made in the preferred embodiment by means of a cam shaft 53 journaled crosswise of the frame 10 in hangers 53' and having cam lobes 54 and 54', respectively, fixed thereon in positions for simultaneous engagement with the rearwardly extending arms 41 and 41' of the levers 40—40', respectively. The cam shaft 53 may alternatively be referred to as a rock shaft, since it is actuated by rocking it into operative engagement with the lever arms 41—41'. Such rocking movement of the shaft 53 is manually produced through a hand lever 55 medially fulcrumed at 56 on a bracket 57 carried by frame 10 with its lower end received between and alternatively engageable with control arms 58 and 59, respectively, fixed to and projecting generally radially from the subjacent end of the rock shaft 53. It will be seen that operative movement of the lever 55 is limited by stops 60 and 61, respectively, shown in Figure 1, which are carried by the bracket 57 and project into the path of swinging movement of the lower end of the lever.

It will be seen that swinging of the lever 55 in a clockwise direction to the position of Figure 1 will raise the cams 54—54' from engagement with their respective lever arms and thus permit the springs 52 to maintain the belt tighteners in resilient tightening engagement with their respective belts 19 and 19'. This will render the power transmissions to the wheels 13—13' operative. On the other hand, where it is desired to simultaneously disengage the drives to both rear wheels, the hand lever 55 may be swung forwardly in a counterclockwise direction so that the ensuing engagement between its lower end and the rearmost arm 59 of the rock shaft 52 will rock the shaft and its associated cams 54—54' into operative engagement with the lever arms 41—41', thereby swinging the belt tightener levers 40—40' to the position indicated in dotted lines in Figure 1, in which the idler wheels 47—47' are simultaneously drawn away from the belts 19—19' to permit simultaneous slippage of these belts. This will, obviously, occur regardless of the position of the control cam 48.

In the overall operation of the invention, as illustrated in the accompanying drawings, where the vehicle is steered in a straight line, the rotational position of the control cam 48 is as shown in Figure 3, wherein the cam followers 49 and 49' are both positioned over the depressed section 48c of the cam and between the inclined cam surfaces 48a and 48b. This permits the springs 52 to maintain the belt tightener levers and their included rollers or sheaves 47—47' both in operative tightening engagement with the belts 19—19' to establish and maintain operative driving connections between the power source 22 and both of the rear drive wheels 13 and 13'. When the operator actuates the steering wheel 37 to cause the vehicle to turn to the left, it will be seen that rotation of the cam 48 with the steering mechanism, including the wheel 30, its supporting fork 31, and shaft 32, will sequentially rotate first the inclined cam surface 48a and then the surface 48d beneath the roller 49, thereby rocking the lever 40 about its fulcrum 43 as the roller 49 rides up inclined cam surface 40a and withdrawing the wheel or sheave 47 from tightening engagement with the belt 19, as indicated in broken lines in Figure 1. As the roller 49 rides onto the cam surface 48d, this surface will cooperate with roller 49 to maintain the disengaged position of the tightener 40. Throughout such coaction between roller 49 and the cam surfaces 48a and 48d it will be seen that the roller 49' will remain between the two inclined cam surfaces 48a and 48b thus to maintain the drive to its associated rear wheel 13'. Thus there will be permitted slippage in the drive to the wheel 13 on the inner side of the turn, while the wheel 13' on the outer side of the turn will have a continuous drive imparted thereto. Accordingly, there will be permitted a differential action as between the two drive wheels 13 and 13', and the driving mechanism of the instant invention may thus be made to accomplish the same function as a usual differential gearing.

The provision of the threaded spindles 50 and 50' for the respective rollers 49 and 49' permits radial adjustment of these rollers, relative to their cooperating cam 48. Where the rollers 49—49' are positioned toward the radially outer periphery of the cam 48, as in Figure 3, only a relatively small angular movement of the cam 48 will be required to cause the cam surfaces 48a or 48b to pass completely beneath their associated rollers and thus actuate the levers 40 or 40' to the full extent of which the cam is capable. On the other hand, adjustment of the spindles 50 and 50' to position the rollers radially inwardly toward the rotational axis of the cam 48 will progressively increase the angular extent of the cam surfaces 48a and 48b which coact with these rollers and thus will produce a more gradual slackening of the belt tension by the levers 40 or 40' responsive to turning of the vehicle in either direction. This, in turn, will, of course, prolong the driving action of whichever belt may be transmitting driving power to the wheel on the inner side of the turn during the making of any given turn and, accordingly, will provide increased traction for the vehicle. Obviously, by suitable radial adjustment of the positions of the rollers 49 and 49' the optimum operating characteristics of the drive mechanism above described may be obtained.

Having thus described our invention, we claim:

1. In a self-propelled wheeled vehicle of the class which is moveable in the direction of its longitudinal axis and which has a dirigible wheel and independently rotatable laterally spaced drive wheels, a power unit carried by said vehicle, separate power transmission mechanisms connected between the power unit and the respective wheels, each such mechanism including a belt drive having a drive belt disposed to transmit driving power from said power unit to one of said drive wheels, and steering mechanism connected to said dirigible wheel for moving said wheel to vary the direction of movement of the vehicle, the combination with said vehicle of a single control cam, said control cam being connected to said dirigible wheel for movement responsive to actuation of said steering mechanism, and belt tighteners comprising rigid levers medially pivoted on said vehicle with corresponding ends of said levers swingable toward and away from tightening engagement with the respective drive belts, means being carried by said lever ends for engagement with the respective belts, both of said belt tightening levers having their ends opposite to said belt engaging ends disposed in direct, continual operative engagement with and controled by said control cam, said cam having inclined cam surfaces positioned to alternately cooperate with the respective levers to permit slippage of one said drive belt as the vehicle is turned in either direction.

2. The combination of claim 1 including resilient spring means connected between said vehicle and the respective belt tightening levers and urging said levers toward belt tightening operative engagement with their respective belts, the said control cam being shaped and disposed to permit such operative engagement during straight line movement of the vehicle, the said cam surfaces of said control cam being normally positioned on opposite sides of and out of engagement with the respective levers during such straight line movement, and each such surface being disposed for engagement with its respective lever responsive to turning of the steering mechanism in one direction only.

3. In a self-propelled wheeled vehicle of the class which is movable in the direction of its longitudinal axis and which has independently rotatable laterally spaced drive wheels, a power unit carried by said vehicle, separate power transmission mechanisms connected between the power unit and the respective wheels, each such mechanism including a drive belt, and steering mechanism for said vehicle moveable to vary the direction of movement of the vehicle, the combination with said vehicle of a control cam, means connecting said cam to the steering mechanism for movement responsive to actuation of said steering mechanism, and belt tighteners, comprising rigid levers medially pivoted on said vehicle with corresponding ends swingable toward and away from tightening engagement with the respective drive belts, means biasing said levers toward belt tightening position, means carried by said lever ends for tightening engagement with the respective belts, the opposite ends of said levers being disposed in direct operative engagement with and control by said control cam, said cam having inclined cam surfaces positioned to alternately engage and cooperate with the respective levers to permit slippage of one belt drive as the vehicle is turned in either direction.

4. The combination defined in claim 1 wherein said control cam is carried by the steering mechanism for rotation about a vertical axis and said cam surfaces are presented in an axial direction.

5. The combination of claim 1 wherein said drive belts are supported for movement through vertical circuits, and said control cam is connected to the steering mechanism for rotation therewith about a generally vertical axis and has its said cam surfaces presented in an axially vertical direction, said belt tightener levers extending longitudinally and being fulcrumed for pivotal movement about a generally horizontal axis.

6. The combination of claim 2 including means for simultaneously pivoting said belt tightener levers to permit slippage of said belt drives simultaneously and independently of the position of said control cam, said pivoting means including cam means engageable with said levers.

7. In a self-propelled vehicle drive mechanism, a pair of separate relatively horizontally spaced driven sheaves and means of supporting same for independent rotation about horizontal axes, a pair of similarly relatively horizontally spaced driving sheaves and means supporting same for rotation about laterally extending axes spaced longitudinally from the axes of the respective driven sheaves, each of said driving sheaves lying in a common longitudinal plane with one of said driven sheaves, and a normally slack endless drive belt passed around each pair of longitudinally aligned driving and driven sheaves, in combination with belt tightening rigid levers medially fulcrumed for swinging movement parallel to said longitudinal planes into and out of operative tightening engagement with the respective drive belts, means so fulcruming the said respective levers, a single control cam for coaction with and in direct contact with both of said levers, and means supporting same for rotation about a fixed generally vertical axis, said cam having relatively circumferentially spaced oppositely axially inclined control surfaces disposed for alternate coaction with the respective levers responsive to rotary movement of the cam in opposite directions, to alternately move said levers relative to their respective belts, the said levers normally projecting and being received between said control surfaces in one rotational position of said cam.

8. In a vehicle drive mechanism, a pair of belt tightener levers medially fulcrumed for movement about parallel axes, means providing fulcrums for said levers, a control cam for said levers and means supporting same for rotation about a fixed axis adjacent corresponding ends of the respective levers, said cam having relatively circumferentially spaced oppositely axially inclined control surfaces disposed for alternate coaction with the respective levers responsive to rotary movement of the cam in opposite directions to alternately rock said levers about their respective fulcrums, the space between said control surfaces being proportioned to receive both of said levers in one rotational position of the cam, said cam surfaces both extending radially relative to the cam axis and each said surface being of varying angular extent in different radial portions thereof, but of uniform inclination throughout its radial extent, the cooperating ends of said levers being disposed generally radially relative to said control cam, each said lever comprising a radially extensible and retractable extension for engagement with said cam, whereby adjustment of said extension to engage its cooperating inclined cam surface at varying radial locations thereon will vary the rate of rocking of the said lever relative to the speed of rotation of the control cam.

9. In a self-propelled wheeled vehicle of the class which is moveable in the direction of its longitudinal axis and which has independently rotatable laterally spaced drive wheels, a power unit carried by said vehicle, separate power transmission mechanisms connected between the power unit and the respective wheels, each such mechanism including a belt drive having a drive belt disposed to transmit driving power from said power unit to one of said wheels, and steering mechanism for said vehicle moveable to vary the direction of movement of the vehicle, the combination with said vehicle of a control cam, means connecting said cam to the steering mechanism for movement responsive to actuation of said steering mechanism, and belt tighteners comprising rigid levers medially pivoted on said vehicle with corresponding ends of said levers swingable toward and away from tightening engagement with the respective drive belts, means being carried by said lever ends for engagement with the respective belts, both of said belt tightening levers having their ends opposite to said belt engaging ends disposed in direct operative engagement with and control by said control cam, said cam having inclined cam surfaces positioned to alternately cooperate with the respective levers to permit slippage of one said drive belt as the vehicle is turned in either direction, said belts being supported for movement through vertical circuits, said cam being moveable about a generally vertical axis and having its cam surfaces axially presented, said belt tighteners extending longitudinally and being fulcrumed medially for movement about generally horizontal axes, said means for simultaneously actuating the belt tighteners including a horizontal rock shaft journaled across the vehicle and having cams thereon disposed to simultaneously swing said belt tightener levers away from said belt drives.

10. In a self-propelled vehicle including a dirigible wheel and a pair of laterally spaced drive wheels, a power unit carried by said vehicle, separate power transmission mechanisms operatively connected between said power unit and the respective drive wheels, each such mechanism including a drive belt for transmitting power from said unit to one of said wheels, the combination with said vehicle of a control cam mounted on said dirigible wheel for movement therewith, and belt tighteners comprising levers pivoted on said vehicle, corresponding ends of said levers being swingable toward and away from tightening engagement with the respective drive belts, pulleys being carried by said lever ends for engagement with the respective belts, said levers having their other ends directly contacting said control cam for actuation thereby, said cam having cam surfaces positioned to alternately pivot said levers to permit slippage of one of said belts as the vehicle is turned in either direction.

11. In a self-propelled vehicle including a pair of laterally spaced drive wheels, a steering mechanism for said vehicle, a power unit carried by said vehicle, separate power transmission mechanisms operatively connected between said power unit and the respective drive wheels, each such mechanism including a drive belt, the combination with said vehicle of a single control cam, means connecting said cam to said steering mechanism for movement responsive to actuation of the steering mechanism, and a pair of belt tighteners, one for each drive belt, said belt tighteners comprising a pair of rigid levers pivoted on said vehicle, corresponding ends of said levers being swingable toward and away from tightening engagement with the respective drive belts, said levers having their other ends in direct, continual contact with said control cam for actuation thereby, said cam having cam surfaces positioned to alternately pivot said levers to permit slippage of one of said belts as the vehicle is turned in either direction.

12. The combination of claim 11 wherein there is provided a rock-shaft having means thereon engageable with said levers for retracting both levers simultaneously from operative tightening engagement with said belts independently of and regardless of the position of said control cam.

13. The combination of claim 12 wherein manually operable means is provided for rocking said rock-shaft and said engageable means comprises a pair of cam lobes on said rock-shaft engageable, respectively, with one of said levers.

References Cited in the file of this patent

UNITED STATES PATENTS

| | | |
|---|---|---|
| 1,266,999 | Schleicher | May 21, 1918 |
| 1,318,894 | Mapes | Oct. 14, 1919 |
| 2,483,599 | Spitzer | Oct. 4, 1949 |

FOREIGN PATENTS

| | | |
|---|---|---|
| 438,768 | France | May 28, 1912 |